Feb. 16, 1971  W. J. WALSH  3,564,444
HIGH GAIN VARIABLE CURRENT SOURCE
Filed Feb. 21, 1966
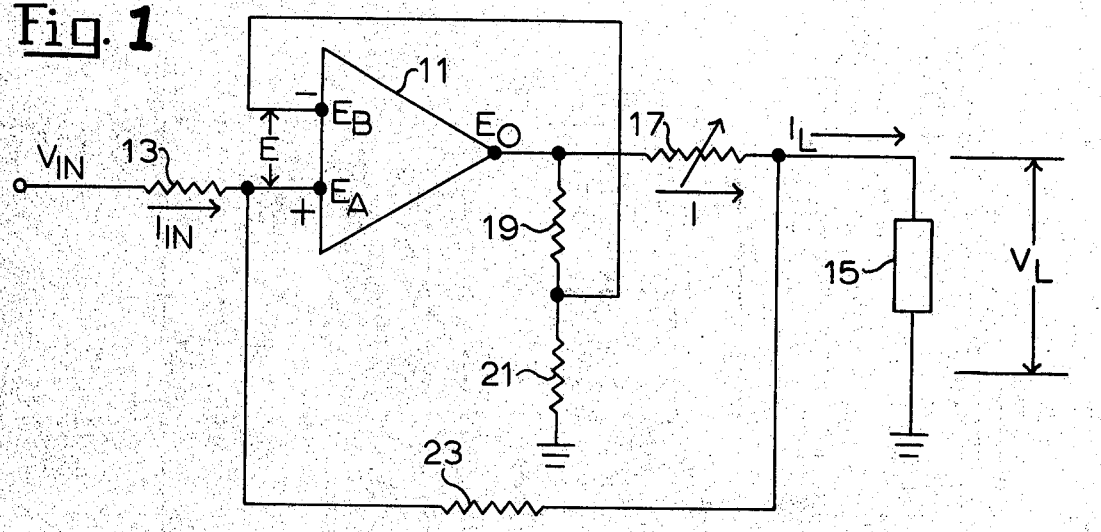
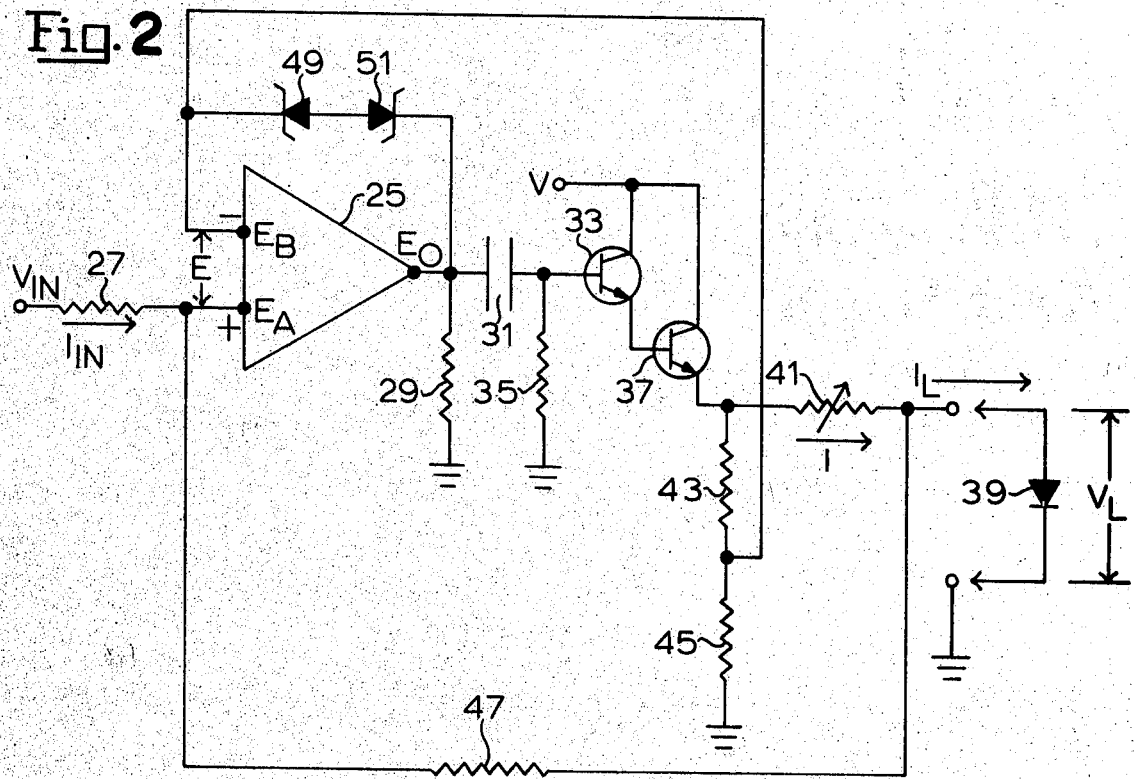
*INVENTOR.*
WILLIAM J. WALSH
BY
*Kevin C. McMahon*
AGENT

United States Patent Office 3,564,444
Patented Feb. 16, 1971

3,564,444
HIGH GAIN VARIABLE CURRENT SOURCE
William J. Walsh, Birmingham, Mich., assignor to Burroughs Corporation, Detroit, Mich., a corporation of Michigan
Filed Feb. 21, 1966, Ser. No. 528,898
Int. Cl. H03f 1/00, 21/00
U.S. Cl. 330—69
8 Claims

ABSTRACT OF THE DISCLOSURE

This invention relates generally to circuits for supplying a controllable current to a load, and, more particularly, to high gain differential amplifier circuits which supply a controllable current to a load, the magnitude of the current being independent of the value of load impedance.

---

Regulated current sources have not found as many uses in the past as have regulated voltage sources, both because they have been more difficult to design and more expensive to build than voltage supplies, and because most engineers tend to design circuits with voltage sources in mind as a power supply. Many situations have arisen, however, in which it is apparent that current supplies are more suitable as a power source than voltage supplies. One of these situations, for example, is in the determining of the forward resistance characteristics of diodes.

In order to use diodes efficiently in precision electronic circuits, especially where reliability is an important factor, the design engineer must know the forward current-voltage characteristics of diodes accurately. Because of the mass production techniques used to manufacture diodes, the forward current-voltage characteristics may vary widely for a given batch of diodes of specific type. This wide variation of parameters frequently necessitates the testing and sorting of diodes to determine their usability in a particular circuit configuration.

Diodes and other electrical components may be purchased in shelf or batch lots, where the parameters are likely to vary widely, or in accordance with predetermined purchase order specifications, wherein the specified parameters will vary only within prescribed limits. In the latter case, the manufacturer tests and sorts the various elements to ensure that the parameters are held within the purchase order specifications.

In testing diodes to insure that they will meet purchase order specifications, it is important, in order to prevent overheating, not to exceed the rated current of the diode for any significant length of time. The low forward resistance of diodes makes this difficult when a voltage supply is used. Usually it is necessary to connect a voltage dropping resistor in series with the diode to limit the current to an acceptable value. This makes it necessary to use meters to determine both the voltage across and the current through the diode, thus increasing the number of readings to be taken and adding to the time and expense required to test the diode. Also, in testing diodes, it is usually preferable, for ease of handling considerations, to ground the cathode of the diode during the test.

By far the preferable method of testing diodes is to use a variable current supply which is able to supply a regulated current of any desired value to the diode, independent of the impedance of the diode, and to use a voltage meter or oscilloscope to read the voltage across the diode for the various selected values of current.

It is therefore an object of my invention to provide a variable, regulated current supply.

It is a further object of my invention to provide current supply in which the current is independent of the load impedance.

It is a still further object of my invention to facilitate the testing of diodes by providing a regulated, controllable current supply which is easy to operate and which allows one terminal of the diode to be grounded during the test.

In accordance with these and other objects of my invention, I provide a circuit for supplying a controllable current to a load, the magnitude of the current being independent of the value of the load impedance. The circuit employs a differential amplifier, the output of which is proportional to the difference between the two inputs. The output current flows to the load through a series-connected resistor. Separate means are provided to feed back one-half of the output voltage to the subtrahend input of the differential amplifier, and to apply to the minuend input one-half of the sum of the input control voltage and the load voltage. With this arrangement, the output current is equal to the input control voltage divided by the value of the series-connected resistor and is independent of the load impedance.

Various other objects, advantages, and features of my invention will become more fully apparent from the following specification with its appended claims and accompanying drawings, in which:

FIG. 1 is a schematic drawing of a current supply circuit of my invention.

FIG. 2 is a schematic diagram of the current supply diode tester circuit of my invention, having filter and current gain stages added for operation in a pulse mode at high current conditions.

My invention can best be understood by referring to the following detailed description of the illustrated embodiments.

Referring to FIG. 1 of the drawings, the input voltage, $V_{IN}$ is connected to the minuend input of a two-input differential amplifier 11 through resistor 13. The output of differential amplifier 11 is connected to the load 15 through variable resistor 17. The other end of the load 15 is grounded. A voltage divider made up of equal value resistors 19 and 21 is connected between the output of differential amplifier 11 and ground. The junction of resistors 19 and 21 is connected directly to the subtrahend input of differential amplifier 11. Resistor 23, which is equal to resistor 13, is connected between the junction of variable resistor 17 and the load 15 and the minuend input of differential amplifier 11.

If we refer to the value of each of the resistors 13 and 23 as $R_1$, the individual value of resistors 19 and 21 as $R_2$, the value of variable resistor 17 as $R_3$, the input voltage as $V_{IN}$, and the input current as $I_{IN}$, then $E_A$, the voltage at the minuend input of the differential amplifier 11, is (1) $$E_A = V_{IN} - R_1 I_{IN}$$

Since the input impedance to the differential amplifier 11 is very high, essentially all the input current $I_{IN}$ flows through resistor 23 and load 15. The combined value of equal resistors 13 and 23 is in the order of 200 kilohms, which is very much greater than the usual value of the impedance of load 15. Therefore, the input current $I_{IN}$, to a very good approximation, is (2) $$I_{IN} = \frac{V_{IN} - V_L}{2R_1}$$

where $V_L$ is the load voltage.

Substituting Equation No. 2 in Equation No. 1 for $I_{IN}$ we get (3) $$E_A = \frac{V_{IN} + V_L}{2}$$

Thus, the voltage applied to the minuend input of the differential amplifier 11 is substantially one-half the sum of the input voltage $V_{IN}$ and the load voltage $V_L$.

Using $E_O$ to represent the output voltage of differential amplifier 11, the equation for the voltage applied to the subtrahend input of differential amplifier 11, $E_B$ is $$(4) \qquad E_B = \frac{E_O R_2}{2R_2} = \frac{E_O}{2}$$

Therefore, the subtrahend input voltage of differential amplifier 11 is one-half of its output voltage.

As is well known, the differential amplifier 11 amplifies the difference between the voltages $E_A$ and $E_B$, so that $$(5) \qquad E_O = KE = K[E_A - E_B]$$

where K is the open loop gain of differential amplifier 11, and E is the difference between the input voltages. Therefore:

$$(6) \qquad E_O = K\left[\frac{V_{IN} + V_L}{2} - \frac{E_O}{2}\right]$$

or $$(7) \qquad \frac{2E_O}{K} = V_{IN} + V_L - E_O$$

For the usual differential amplifier, the gain, K, is very large, i.e., $10^4$ or greater, thus Equation 7, for practical purposes, becomes:

$$(8) \qquad V_{IN} + V_L - E_O = 0$$

therefore:

$$(9) \qquad E_O = V_{IN} + V_L$$

The current through resistor 17 is given by the equation $$(10) \qquad I = \frac{E_O - V_L}{R_3}$$

but combining Equations 9 and 10, we may write $$(11) \qquad I = \frac{V_{IN}}{R_3}$$

The current I divides between resistor 23 and the load 15, but since the resistance $R_1$ is much greater than the resistance of the load, the current through the load $I_L$ can be closely approximated by the current I; therefore $$(12) \qquad I_L = \frac{V_{IN}}{R_3}$$

Thus, as long as the resistance $R_1$ is much greater than the load resistance $R_L$, the load current is independent of the impedance of the load and depends only on the values of $V_{IN}$ and resistor 17, either of which may be varied to control the load current.

The circuit of FIG. 2 is identical in its principle of operation to the circuit of FIG. 1, the only difference between them being that the circuit of FIG. 2 is modified for pulse rather than DC excitation and two emitter follower stages have been included to increase the current gain. These changes make the circuit more suitable for use as a diode tester.

The input voltage $V_{IN}$ is connected to the minuend input of differential amplifier 25 through resistor 27. The output of differential amplifier 25 is connected to a high pass filter at the junction of resistor 29 and capacitor 31. The other side of capacitor 31 is connected to the base of NPN transistor 33 and to resistor 35. The other ends of resistors 29 and 35 are grounded. The emitter of transistor 33 is connected to the base of NPN transistor 37. The collectors of both transistors 33 and 37 are connected to a voltage source V, and the emitter of transistor 37 is connected to the anode of the test diode 39 through variable resistor 41. The cathode of test diode 39 is grounded. A voltage divider made up of equal resistors 43 and 45 is connected between the emitter of transistor 37 and ground. The junction of resistors 43 and 45 is connected directly to the subtrahend input of differential amplifier 25. Resistor 47 is connected between the anode of diode 39 and the first input of differential amplifier 25, and is equal in value to resistor 27.

Zener diodes 49 and 51 are connected in a back-to-back configuration between the output of differential amplifier 25 and the subtrahend input to prevent the differential amplifier 25 from saturating when the test diode is removed.

The circuit of FIG. 2 operates in exactly the same manner as that of FIG. 1, so that the equations derived above for FIG. 1 apply also to FIG. 2, with the individual resistances of resistors 27 and 47 being equal to $R_1$ and the individual resistances of resistors 43 and 45 being equal to $R_2$. The resistance of variable resistor 41 is equal to $R_3$. The high pass filter section made up of resistors 29 and 35 and capacitor 31 is included to make the circuit more suitable for pulse mode operation and the emitter follower connected transistors 33 and 37 are included to provide greater current gain in the circuit.

When used for testing diodes, the circuit in FIG. 2 is operated in the pulsed mode so that currents higher than the DC ratings for the diode may be used without damaging the diode by overheating. Typically, a pulse width of 200 microseconds and duty cycle of 1% is used, thereby allowing several amperes of current to be passed through the diode without damaging it. Diode currents from one milliampere to five amperes can be obtained by varying the value of variable resistor 41 from five kilohms to one ohm. The forward voltage drop across the diode for each value of diode current can then be observed on an oscilloscope. It is important for the proper operation of my current supply circuit that resistor 27 be equal to resistor 47, and that resistor 43 be equal to resistor 45, so that the proper voltages are applied to the input terminals of differential amplifier 25. If these conditions do not obtain, the load current will be dependent on the load voltage. It is, therefore, advisable to use very close tolerance resistors for these components.

The current supply circuit of FIG. 2 exhibits an extremely high current gain. The input or control current $I_{IN}$ can be seen from FIG. 2 to be:

$$(13) \qquad I_{IN} = \frac{V_{IN} - E_A}{R_1}$$

but from Equation 3 we have that $$E_A = \frac{V_{IN} + V_L}{2}$$

therefore:

$$(14) \qquad I_{IN} = \frac{V_{IN} - V_L}{2R_1}$$

If we define the current gain to be $I_L/I_N$, then $$(15) \qquad \frac{I_L}{I_{IN}} = \frac{I_L 2R_1}{V_{IN} - V_L}$$

Taking typical values of the various parameters, we have that $I_L = 1$ ampere
$V_L = 1$ volt
$V_{IN} = 5$ volts
$R_1 = 100$ kilohms therefore $$(16) \qquad \frac{I_L}{I_N} = \frac{1 \text{ ampere} \cdot 2 \cdot 100{,}000 \text{ ohms}}{5 \text{ volts} - 1 \text{ volt}} = 50{,}000$$

Hence, a very small control current, $I_{IN}$, in this case 20 microamperes, can produce a 1 ampere load current.

The following component values have been found suitable for the circuit of FIG. 2.

Differential amplifier 25—A high input impedance, high gain differential operational amplifier such as Data Device Corporation Type DD8

Resistors:
    27—100,000±1%
    29—50,000
Capacitor 31—2
Transistor 33—2N3015
Resistor 35—50,000
Transistor 37—RCA40250
Resistors:
    43—1,000±1%
    45—1,000±1%
    47—100,000±1%
Zener diodes:
    49—9 v. Zener
    51—9 v. Zener All values of resistance are given in ohms. All values of capacitance are given in microfarads.

It is to be understood that this description is by way of illustration only, and, as will be obvious to one skilled in the art, the current supply circuit of my invention may find many uses in circuits other than diode test circuits.

I claim:

1. A high gain variable current supply circuit, said circuit being controllable by an input control voltage, for supplying a regulated current to a load, the value of the current being independent of the impedance of the load, comprising:
a two-input differential amplifier, said differential amplifier having a high input impedance and a high open loop gain,
resistive means connecting the output of said differential amplifier to said load,
means for supplying one-half of the output voltage of said differential amplifier to the subtrahend input of said differential amplifier, and
means for supplying one-half of the sum of the input control voltage and the load voltage to the other input of said differential amplifier.

2. The circuit of claim 1 wherein said means for supplying one-half the output voltage of said differential amplifier to the subtrahend input of said differential amplifier comprises:
voltage divider means connected between the output of said differential amplifier and ground, and
means coupling said voltage divider means to the subtrahend of said differential amplifier.

3. The circuit of claim 1 wherein said resistive means is variable.

4. A variable current supply circuit, said circuit being controllable by an input control voltage, for supplying a regulated current to a load, the value of the current being independent of the load impedance, comprising:
high gain, high input impedance amplifier means for amplifying the difference between one-half the sum of the input control voltage and the load voltage and one-half the output voltage of said amplifier means, and
resistive means connecting the output of said amplifier means to said load.

5. The circuit of claim 4 wherein said amplifier means includes:
a two-input differential amplifier, and
current amplifier means for increasing the current gain of said circuit.

6. The circuit of claim 5 wherein said current amplifier means further includes a high pass filter section.

7. The circuit of claim 5 wherein said current amplifier means further includes a plurality of emitter-follower connected transistors.

8. The circuit of claim 7 wherein said amplifier means further includes a pair of Zener diodes back-to-back connected between the output and one input of said differential amplifier.

References Cited

UNITED STATES PATENTS 2,930,982   3/1960   Patterson          328—158
3,356,961   12/1967  Sedlmeyer        330—69

NATHAN KAUFMAN, Primary Examiner

U.S. Cl. X.R.

330—24, 30, 32, 110